US007287045B2

(12) United States Patent
Saika et al.

(10) Patent No.: US 7,287,045 B2
(45) Date of Patent: Oct. 23, 2007

(54) BACKUP METHOD, STORAGE SYSTEM, AND PROGRAM FOR BACKUP

(75) Inventors: Nobuyuki Saika, Yokosuka (JP); Naohiro Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 26 days.

(21) Appl. No.: 10/898,225

(22) Filed: Jul. 26, 2004

(65) Prior Publication Data
US 2005/0216535 A1    Sep. 29, 2005

(30) Foreign Application Priority Data
Mar. 29, 2004    (JP)    ............... 2004-096277

(51) Int. Cl.
*G06F 12/16*    (2006.01)
(52) U.S. Cl. .................. 707/203; 707/204; 711/161; 711/162
(58) Field of Classification Search ............... None
See application file for complete search history.

(56) References Cited

U.S. PATENT DOCUMENTS

| 6,366,986 | B1* | 4/2002 | St. Pierre et al. ........... 711/162 |
| 6,385,706 | B1 | 5/2002 | Ofek et al. |
| 6,629,110 | B2 | 9/2003 | Cane et al. |
| 6,651,075 | B1* | 11/2003 | Kusters et al. ............. 707/204 |
| 6,748,504 | B2* | 6/2004 | Sawdon et al. ............. 711/162 |
| 2003/0167380 | A1* | 9/2003 | Green et al. ................ 711/136 |
| 2003/0188116 | A1 | 10/2003 | Suzuki et al. |
| 2004/0098547 | A1* | 5/2004 | Ofek et al. ................. 711/162 |
| 2004/0107222 | A1* | 6/2004 | Venkatesh et al. .......... 707/200 |
| 2004/0133602 | A1* | 7/2004 | Kusters et al. ............ 707/104.1 |
| 2004/0172577 | A1* | 9/2004 | Tan et al. ..................... 714/13 |

FOREIGN PATENT DOCUMENTS

| JP | 2002-373093 | 12/2002 |
| JP | 2003-280825 | 10/2003 |

OTHER PUBLICATIONS

Unix Internals, The New Frontiers by Vahalia Uresh (published 1996). pp. 229-230.*
M. Kaczmarski, eta l., "Beyond Backup Toward Storage Management", IBM Systems Journal, vol. 42, No. 2, 2003, pp. 322-337.

* cited by examiner

*Primary Examiner*—Hyung Sough
*Assistant Examiner*—Kaushik Patel
(74) *Attorney, Agent, or Firm*—Antonelli, Terry, Stout & Kraus, LLP.

(57) ABSTRACT

A backup method is provided for use with a storage system composed of a memory which stores a control program, a disk drive having an primary volume, a differential volume, and mapping information, the primary volume storing data sent from a client, the differential volume storing differential data of a snapshot of the primary volume, the mapping information managing the relation between data stored in the primary volume and differential data stored in the differential volume, and a control processor which controls read and write of data in the disk drive. The mapping information is referred to compose the data stored in the primary volume and the differential data stored in the differential volume. The composed data is sent to a backup device.

4 Claims, 10 Drawing Sheets

<P-VOL>

| STORAGE ADDRESS | DATA |
|---|---|
| P1 | aaaaa |
| P2 | bbbbb |
| P3 | ccccc |
| : | : |

<D-VOL>

| STORAGE ADDRESS | DATA |
|---|---|
| D1 | AAAAA |
| D2 | BBBBB |
| D3 | |
| : | : |

<MAPPING TABLE>

| PRIMARY VOLUME STORAGE ADDRESS | CHANGED/UNCHANGED BIT MAP | SNAPSHOT 1 DIFFERENTIAL VOLUME STORAGE ADDRESS | SNAPSHOT 2 DIFFERENTIAL VOLUME STORAGE ADDRESS |
|---|---|---|---|
| P1 | 10 | D1 | |
| P2 | 11 | D2 | D2 |
| P3 | UNCHANGED | | |
| : | UNCHANGED | | |
| : | UNCHANGED | | |

<P-VOL>

| STORAGE ADDRESS | DATA |
|---|---|
| P1 | AAAAA |
| P2 | BBBBB |
| P3 | CCCCC |
| .. | |

<D-VOL>

| STORAGE ADDRESS | DATA |
|---|---|
| D1 | |
| D2 | |
| D3 | |
| .. | |

<MAPPING TABLE>

| PRIMARY VOLUME STORAGE ADDRESS | CHANGED/UNCHANGED BIT MAP | SNAPSHOT 1 DIFFERENTIAL VOLUME STORAGE ADDRESS |
|---|---|---|
| P1 | UNCHANGED | |
| P2 | UNCHANGED | |
| P3 | UNCHANGED | |
| .. | UNCHANGED | |
| .. | UNCHANGED | |

FIG.6

<P-VOL>

| STORAGE ADDRESS | DATA |
|---|---|
| P1 | aaaaa |
| P2 | bbbbb |
| P3 | ccccc |
| .. | .. |

<D-VOL>

| STORAGE ADDRESS | DATA |
|---|---|
| D1 | AAAAA |
| D2 | BBBBB |
| D3 | |
| .. | .. |

<MAPPING TABLE>

| PRIMARY VOLUME STORAGE ADDRESS | CHANGED/UNCHANGED BIT MAP | SNAPSHOT 1 DIFFERENTIAL VOLUME STORAGE ADDRESS | SNAPSHOT 2 DIFFERENTIAL VOLUME STORAGE ADDRESS |
|---|---|---|---|
| P1 | 10 | D1 | |
| P2 | 11 | D2 | D2 |
| P3 | UNCHANGED | | |
| .. | UNCHANGED | | |
| .. | UNCHANGED | | |

BACKUP METHOD, STORAGE SYSTEM, AND PROGRAM FOR BACKUP

CLAIM OF PRIORITY

The present application claims priority from Japanese application P2004-096277 filed on Mar. 29, 2004, the content of which is hereby incorporated by reference into this application.

BACKGROUND

This invention relates to a data backup method for a storage device, in particular, a method of storing differential snapshot data with efficiency.

Data in a storage device can be protected by several known protective functions, one of which is a snapshot function. The snapshot function is a function to keep data of a storage device at a designated time point (snapshot) and to provide the kept data to a user. A method to obtain the snapshot function is volume mirroring in which the entirety of a record area (primary volume) in a storage device is copied to another area (secondary volume) (refer to JP 2002-373093 A).

Another method proposed to obtain the snapshot function is differential snapshot in which update of data recorded in a primary volume is accompanied by copying of the updated data, instead of the whole data in the primary volume, to another volume (differential volume) for keeping. Since only updated data is copied, this differential snapshot method takes less disk capacity than volume mirroring which copies the entire volume. Still another method proposed is to make a system respond to a user faster when there is a data write request while a snapshot is accessed by the user (refer to JP 2003-280825 A). This method enables a user to acquire a large number of snapshots with ease.

SUMMARY

In taking a backup of data recorded in a storage device that contains multiple differential snapshots to store the backup data in another storage device (a magnetic tape device, for example), the entire record of a primary volume and a differential volume in the former storage device is copied to the latter, and no prior art has addressed the matter of backing up data of a designated snapshot alone.

According to this invention, there is provided a backup method for use with a storage system, the storage system including: a network attached storage device which provides a file sharing service to a client used by a user; a backup device to which data recorded in the network attached storage device is backed up; and a management client which requests the network attached storage device to take the backup, the network attached storage device including: a memory which stores a control program; a disk drive having an primary volume, a differential volume, and mapping information, the primary volume storing data sent from the client, the differential volume storing differential data of a snapshot of the primary volume, the mapping information managing the relation between data stored in the primary volume and differential data stored in the differential volume; and a control processor which controls read and write of data in the disk drive, in which: the control processor executes: a first step of composing the data stored in the primary volume and the data stored in the differential volume by referring to the mapping information; and a second step of sending the composed data to the backup device.

According to this invention, it becomes possible to backup data of a designated snapshot of the storage device alone.

DETAILED DESCRIPTION OF THE PREFERRED EMBODIMENT

Figure 1:
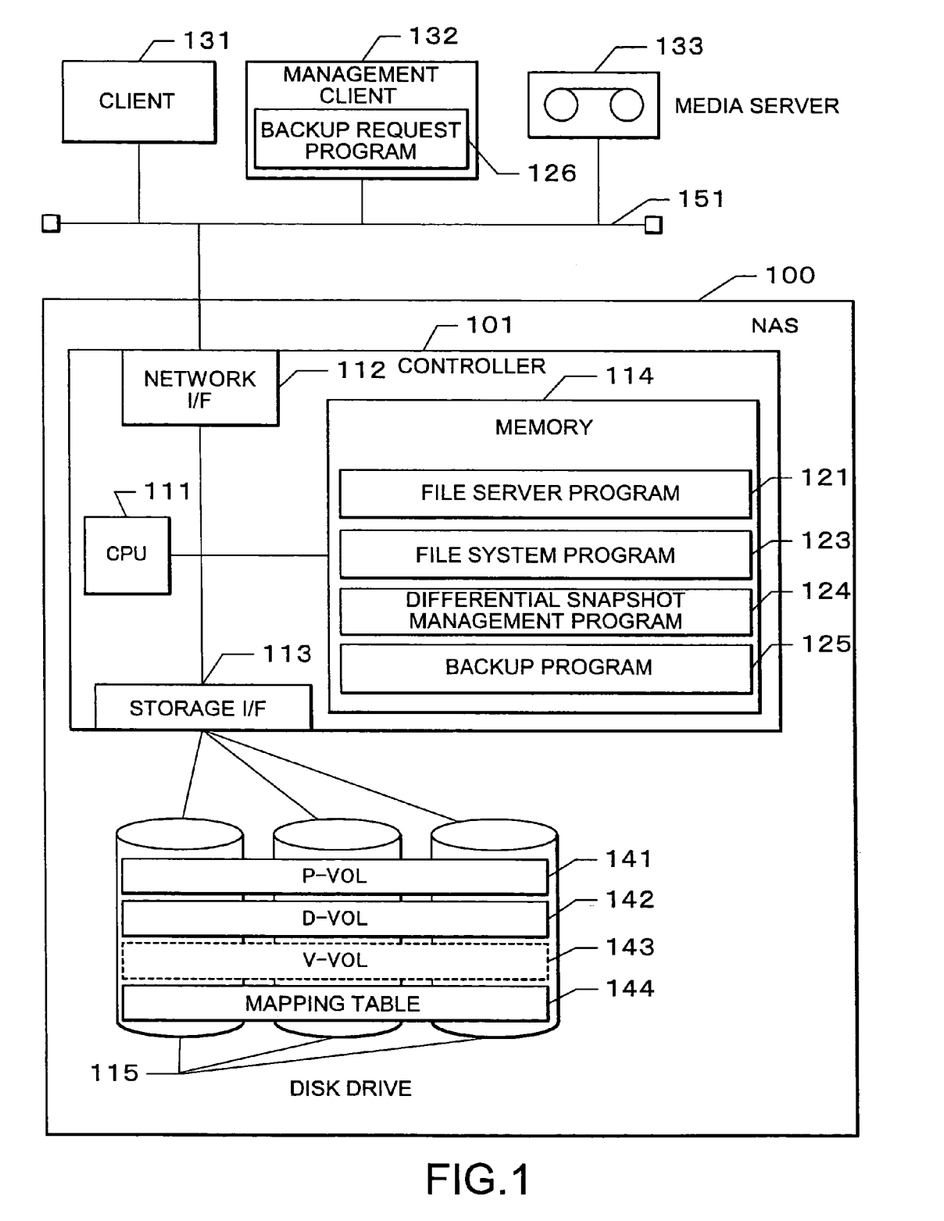
FIG. 1 is a block diagram of a computer system to which a differential snapshot backup method according to an embodiment of this invention.

FIG. 1 is a block diagram of a storage system according to an embodiment of this invention.

The storage system is composed of a client 131, a management client 132, a media server 133, and a network attached storage device (NAS) 100 which are interconnected by a network 151 to communicate with one another.

The network 151 uses a protocol such as TCP/IP in communications to transfer control signals and data among the devices that are connected to the network 151.

The client 131 is a computer device operated by a user, and accesses the NAS 100 to read and write data. There may be more than one client 131 connected to the network 151.

The management client 132 is a computer device operated by an administrator of the computer system, and is used to manage the NAS 100. The management client 132 has at least a CPU, a memory, and an interface. The memory stores at least a backup request program 126 executed by the CPU. The backup request program 126 is executed when data recorded in the NAS 100 is transferred for backup to the media server 133. A more detailed description will be given later on the backup request program 126 referring to FIG. 5.

The media server 133 is a device for backing up data that is recorded in the NAS 100 to a recording medium such as a tape, and may be a magnetic tape device or a large-capacity magnetic disk drive.

The NAS 100 provides the client 131 with a file sharing service. The NAS 100 is composed of a controller 101 and a disk drive 115.

The disk drive 115 may be a single disk drive or may be a RAID or similar disk array composed of plural disk drives. The disk drive 115 holds blocks of files on which a write request is made from the client 131.

A primary volume (P-VOL) 141 and a differential volume (D-VOL) 142 are set in the disk drive 115. These volumes are units respectively recognizable as one disk by an operating system (not shown), and logically are independent disks. Physically, however, the volumes may be a part of one disk or may be a collection of parts of plural disks.

The primary volume 141 is used in normal operation and data is written on a block-by-block basis in the primary volume 141 as the client 131 issues a write request. When the client 131 issues a normal read request, data in the primary volume 141 is read block by block.

A block that has been recorded in the primary volume 141 is copied to the differential volume 142 upon copy on write of a differential snapshot. In other words, once the client 131 or the management client 132 issues a request to create a differential snapshot, data prior to overwrite is copied to the differential volume 142 each time a block in the primary volume 141 is overwritten. The primary volume 141 can be recovered to the state it is in when the request to create the differential snapshot is received by combining the block recorded in the primary volume 141 and the block recorded in the differential volume 142.

A virtual volume (V-VOL) 143 is an imaginary volume created to recover, upon receiving a request to compose a differential snapshot from the client 131 or the management client 132, the primary volume 141 to the state it is in when a request to create the differential snapshot is made and to provide the recovered volume to the client that has made the request. The virtual volume 143 is composed of some of blocks of the primary volume 141 and some of blocks of the differential volume 142. A more detailed description will be given later on these volumes.

A mapping table 144 is recorded in the disk drive 115. The mapping table 144 is a table for recording the association between a block address in the primary volume 141 and a block address in the differential volume 142 for each snapshot created, and indicates to which block in the differential volume 142 a block of the primary volume 141 is copied. The mapping table 144 is referred when creating the virtual volume 143. A more detailed description will be given later on the mapping table 144.

The controller 101 is composed of a CPU 111, a network interface (I/F) 112, a storage interface (I/F) 113, and a memory 114.

The CPU 111 executes various programs stored in the memory 114 to control the network attached storage device 100.

The memory 114 stores a file server program 121, a file system program 123, a differential snapshot management program 124, and a backup program 125 which are executed on a NAS_OS (not shown).

The file server program 121 requests the file system program 123 to execute processing of reading or writing a file or a directory upon receiving a data access request from the client 131, and sends the result of executing the processing to the client 131 that has made the request. The file server program 121 also handles user authorization and manages file sharing among plural users by giving a user a right to access.

Figure 2:
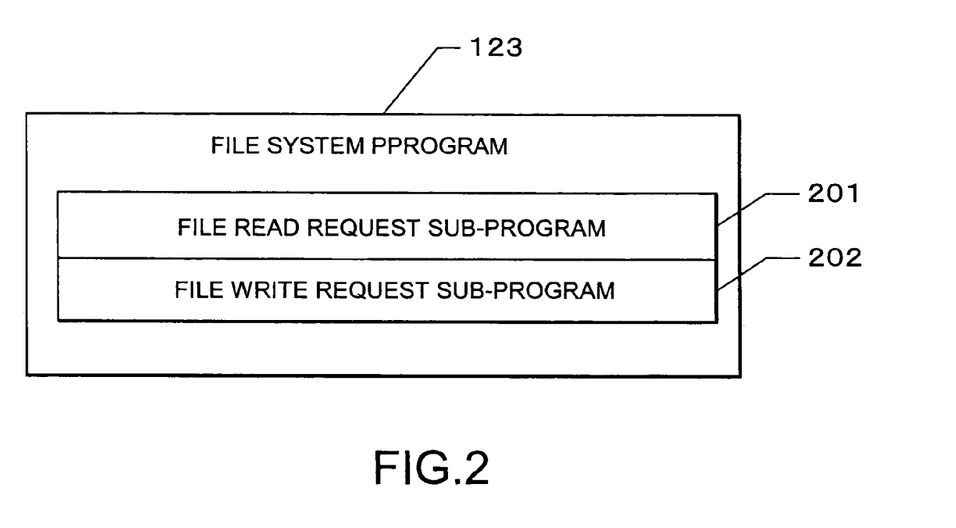
FIG. 2 is an explanatory diagram of a file system program according to the embodiment of this invention.

FIG. 2 is an explanatory diagram of the file system program 123 according to the embodiment of this invention.

The file system program 123 contains, at least, a file read request sub-program 201 and a file write request sub-program 202. In response to a request to read or write a file or a directory which is issued from the file server program 121 or the differential snapshot management program 124, the file system program 123 issues a data read command or a data write command to the snapshot management program 124 while designating the volume where the file or the directory is stored and the position and size of the block to be accessed. A detailed description will be given later on the file read request sub-program 201 with reference to FIG. 11.

Figure 3:
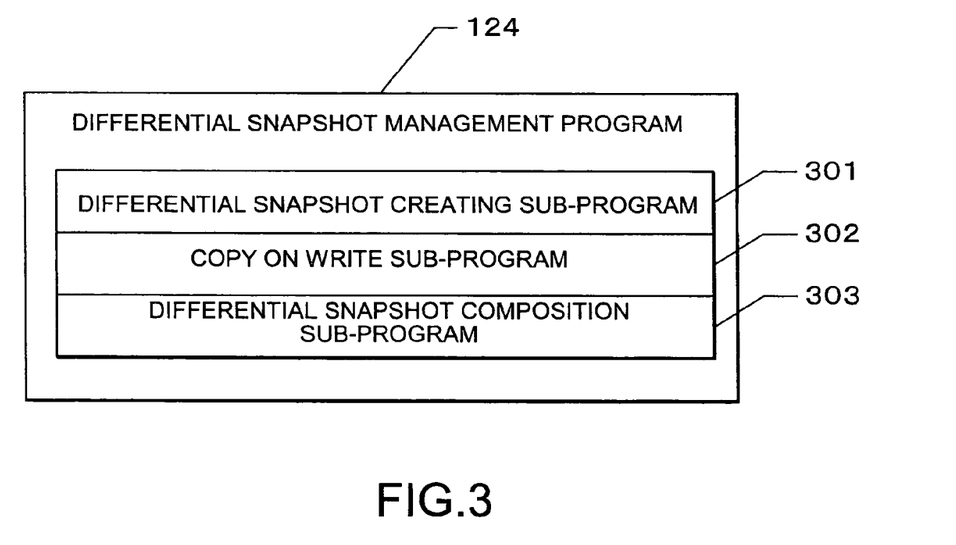
FIG. 3 is an explanatory diagram of a differential snapshot management program according to the embodiment of this invention.

FIG. 3 is an explanatory diagram of the snapshot management program 124 according to the embodiment of this invention.

The snapshot management program 124 contains, at least, a differential snapshot creating sub-program 301, a copy on write sub-program 302, and a differential snapshot composition sub-program 303.

The differential snapshot creating sub-program 301 creates a snapshot of the primary volume 141. The snapshot is used to manage data stored in the primary volume 141 and the differential volume 142 in a manner that enables the copy on write sub-program 302 to access data that has been stored in the primary volume 141 upon creation of the snapshot with the use of the mapping table 144, which will be described later. The created snapshot of the primary volume 141 is provided by the virtual volume 143 when the virtual volume 143 is made accessible. To this purpose, the differential snapshot creating sub-program 301 sets an area of the mapping table 144 upon receiving a snapshot creating request from the client 131.

The copy on write sub-program 302 manages the differential volume 142 which stores differential data necessary to maintain snapshots, and carries out processing for maintaining snapshots which accompanies data write processing executed upon request from the file system program 123. To give designation, when writing data in the primary volume 141 using the mapping table 144, the snapshot management program 124 copies, to the differential volume 142, data stored in the primary volume 141 prior to update and then updates the contents of the primary volume 141.

The differential snapshot composition sub-program 303 uses the primary volume 141 and the differential volume 142 to carry out processing of reading the virtual volume 143 (namely, processing that enables a program to utilize a snapshot) in response to a request from the file system program 123 or the backup program 125. Specifically, the differential snapshot composition sub-program 303 refers to the mapping table 144 to decide from which of the primary volume 141 and the differential volume 142 to read data, and composes, from the address of the volume chosen, the virtual volume 143 for providing data that has been stored in the primary volume 141 upon request of creating the snapshot.

A more detailed description will be given later with reference to FIGS. 6 and 7 on snapshots created and managed by the snapshot management program 124. The operation of the differential snapshot composition sub-program 303 will be described later in more detail referring to FIG. 12.

Figure 4:
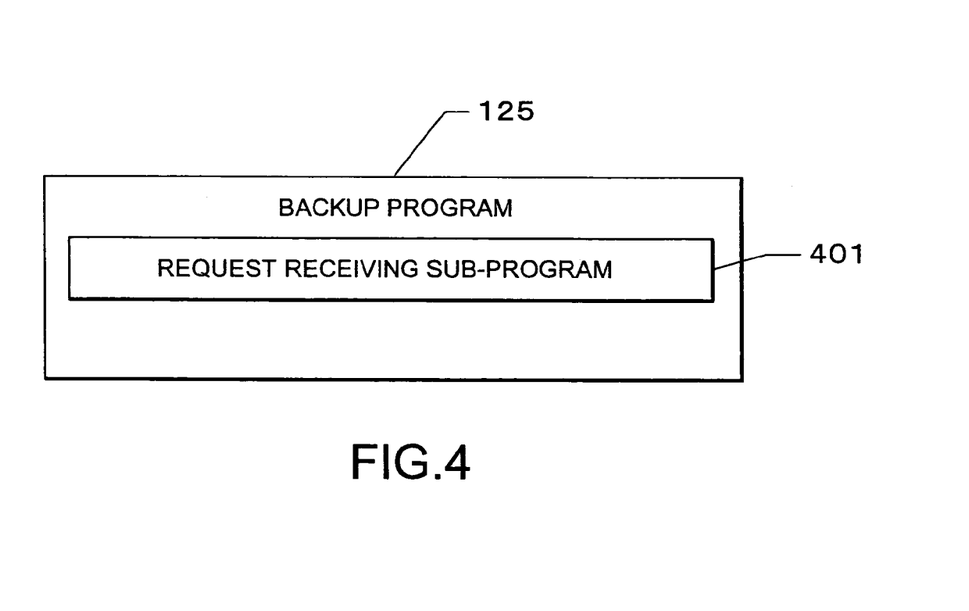
FIG. 4 is an explanatory diagram of a backup program according to the embodiment of this invention.

FIG. 4 is an explanatory diagram of the backup program 125 according to the embodiment of this invention.

Receiving a backup request that designates a snapshot from the management client 132, the backup program 125 transfers, for backup, to the media server 133, data of the designated snapshot out of data recorded in the disk drive 115. The backup program 125 contains, at least, a request receiving sub-program 401, which processes a backup request and the like. The operation of the request receiving sub-program 401 will be described later in detail with reference to FIG. 10.

Figure 5:
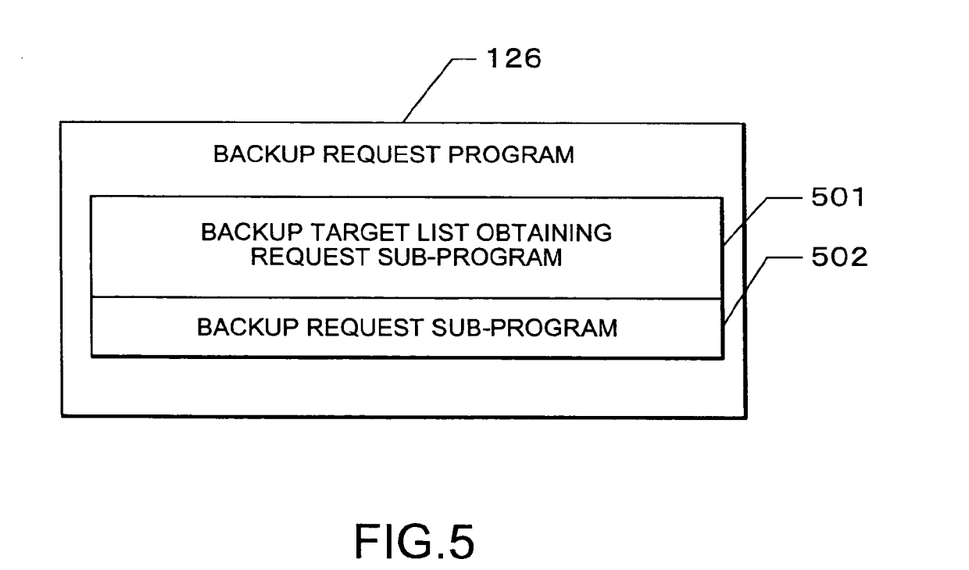
FIG. 5 is an explanatory diagram of a backup request program according to the embodiment of this invention.

FIG. 5 is an explanatory diagram of the backup request program 126 according to the embodiment of this invention.

The backup request program 126 is executed when the management client 132 requests the backup program 125 to take a backup of data recorded in the disk drive 115. The backup request program 126 contains, at least, a backup target list obtaining request sub-program 501 and a backup request sub-program 502. The operation of the sub-programs 501 and 502 will be described later in detail with reference to FIGS. 8 and 9.

Figure 6:
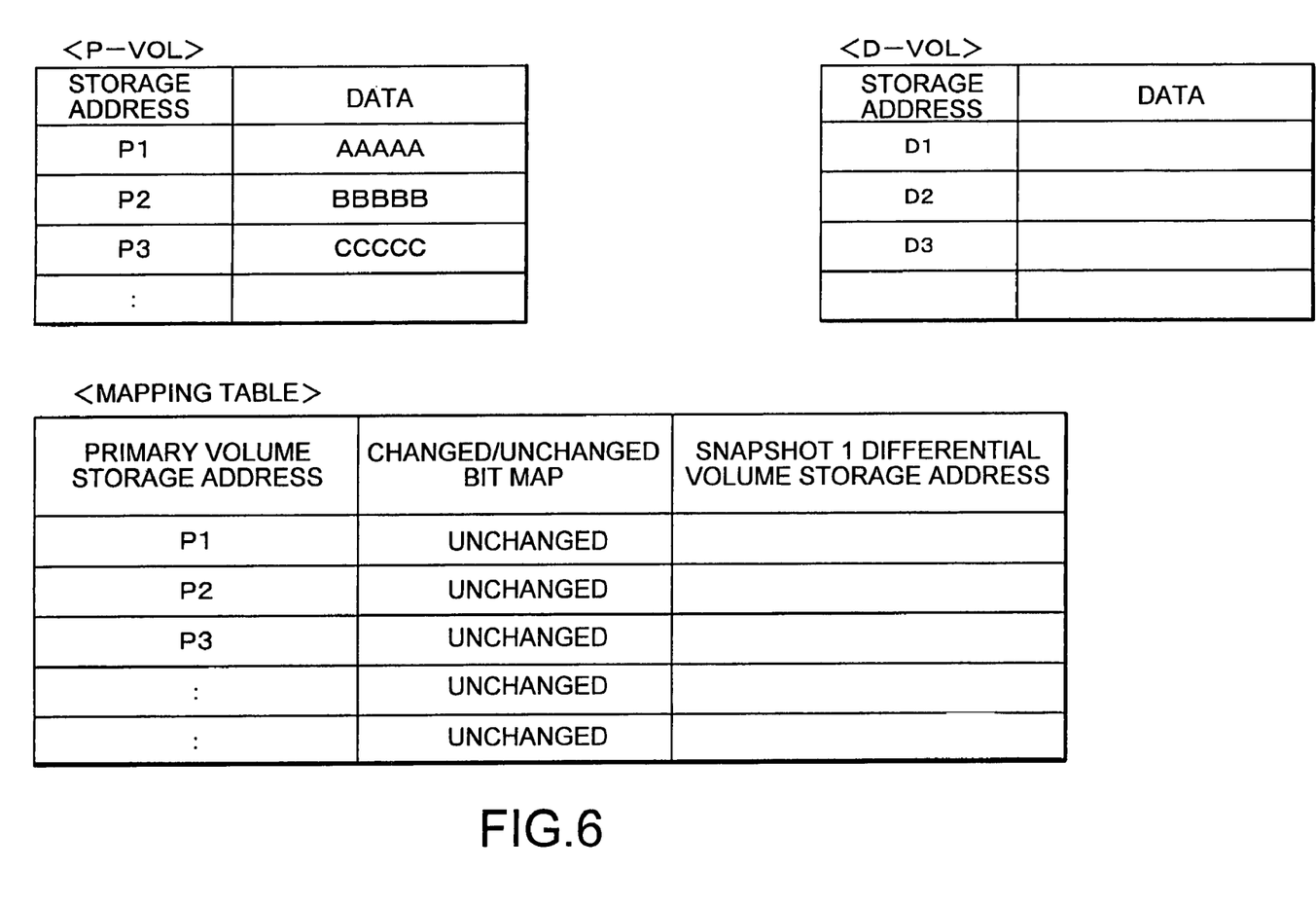
FIG. 6 is an explanatory diagram of snapshot management according to the embodiment of this invention.
Figure 7:
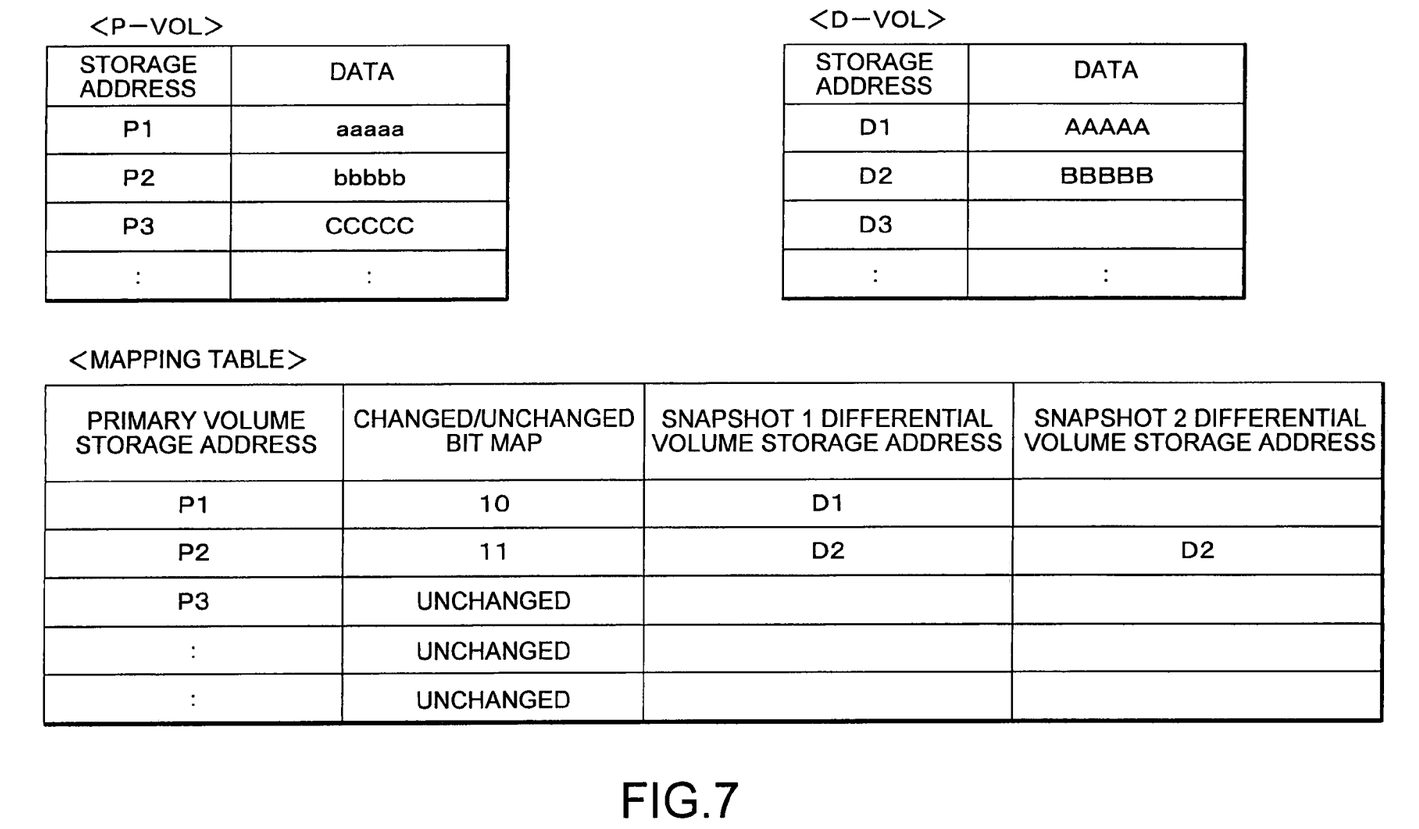
FIG. 7 is an explanatory diagram of snapshot management according to the embodiment of this invention.

FIGS. 6 and 7 are explanatory diagrams of snapshot management according to the embodiment of this invention.

In FIGS. 6 and 7, <P-VOL> and <D-VOL> show the contents of the primary volume 141 and the differential volume 142, respectively. <P-VOL> and <D-VOL> each have a "storage address" column which shows the address of a block stored in the respective volume, and a "data" column which shows the contents of a block stored. <Mapping Table> shows the contents of the mapping table 144. In <Mapping Table>, a "primary volume storage address" column shows the address of a block stored in the primary volume 141, a "changed/unchanged bit map" column shows creation of which snapshot is followed by a change in a block stored in the primary volume 141, and a "snapshot 1 differential volume storage address" column and a "snapshot 2 differential volume storage address" column disclose the address in the differential volume 142 where a block stored in the primary volume 141 is copied.

Receiving a request to create a snapshot, the differential snapshot creating sub-program 301 registers in the mapping table 144 (the "snapshot 1 differential volume storage address" column of <Mapping Table> in FIG. 6) new identification information of the virtual volume 143. No data storage address (block address) is registered in the differential volume storage address column of the mapping table 144 at the time of creation of the snapshot, and therefore blocks of the virtual volume 143 are associated with blocks of the primary volume 141 on a one by one basis.

When data in the primary volume 141 is to be updated subsequently, the copy on write sub-program 302 copies, to the differential volume 142, data in the primary volume 141 prior to update and, after this copying is completed, updates the contents of the primary volume 141. The copy on write sub-program 302 also updates the mapping table 144 so that a block in the virtual volume 143 that corresponds to a block in the primary volume 141 where data is updated is associated with a block in the differential volume 142 that stores the data stored in the primary volume 141 at the time of creation of the snapshot (namely, the data prior to the update).

An example is given in FIG. 7; to rewrite the contents (data) of a block whose storage address in the primary volume 141 is P1 and to change the data from "AAAAA" to "aaaaa" during a period from creation of a snapshot 1 to creation of a snapshot 2, the data "AAAAA" prior to the rewrite is copied to the differential volume 142 at a storage address D1 and then the data "aaaaa" is stored at the storage address P1 in the primary volume 141. At this point, the storage address D1 of the data prior to the update is stored in the snapshot 1 differential volume storage address column that corresponds to the primary volume storage address P1 in the mapping table 144. "1", which indicates that there is differential data stored for the snapshot 1, is stored as the first significant bit of the changed/unchanged bit map in the mapping table 144.

To rewrite data of a block whose storage address in the primary volume 141 is P2 and to change the data from "BBBBB" to "bbbbb" during a period from creation of the snapshot 2 to the present, the data "BBBBB" prior to the rewrite is copied to the differential volume 142 at a storage address D2 and then the data "bbbbb" is stored at the storage address P2 in the primary volume 141. In this case, the storage address D2 of the data prior to the update is stored in the snapshot 2 differential volume storage address column that corresponds to the primary volume storage address P2 in the mapping table 144. At this point, D2 is stored not only in the snapshot 2 differential volume storage address column but also in the snapshot 1 differential volume storage address column that needs this prior-to-update data.

Then "11", which indicates that there is differential data stored for the snapshots 1 and 2, is stored in the changed/unchanged bit map column in the mapping table 144 that corresponds to the primary volume storage address P2 (in other words, "1" is stored for the first significant bit and for the second significant bit each in the changed/unchanged bit map of the mapping table). On the other hand, "10", which indicates that there is differential data stored for the snapshot 1 alone, is stored in the changed/unchanged bit map column in the mapping table 144 that corresponds to the primary volume storage address P1. To summarize, there is differential data stored for the snapshot 1 when the most significant bit (the bit shown on the left side) among bits shown in the changed/unchanged bit map columns is "1," whereas there is differential data stored for the snapshot 2 when the least significant bit (the bit shown on the right side) is "1".

The file system program 123 issues a request to the differential snapshot composition sub-program 303 to access the virtual volume 143. Receiving the request, the differential snapshot composition sub-program 303 refers to the mapping table 144 to access a block in the primary volume 141, or a block in the differential volume 142, that is associated with a block in the virtual volume 143 to read data of the block. This enables the file system program 123 to utilize, by accessing the virtual volume 143, information that has been stored in the primary volume 141 when a snapshot creating request is issued and to thus provide the client 131 or the management client 132 with a snapshot image of a file system.

In short, the virtual volume 143 is an imaginary volume composed of one or more storage area in the disk drive and, in practice, is made up of some of blocks of the primary volume 141 and some of blocks of the differential volume 142.

For example, in FIG. 7, the virtual volume 143 that corresponds to the primary volume 141 at the time of creation of the snapshot 1 is a composition of "AAAAA" at D1 which is differential data corresponding to P1, "BBBBB" at D2 which is differential data corresponding to P2, and, since there is no differential data corresponding to P3, "CCCCC" stored in the primary volume 141.

Figure 8:
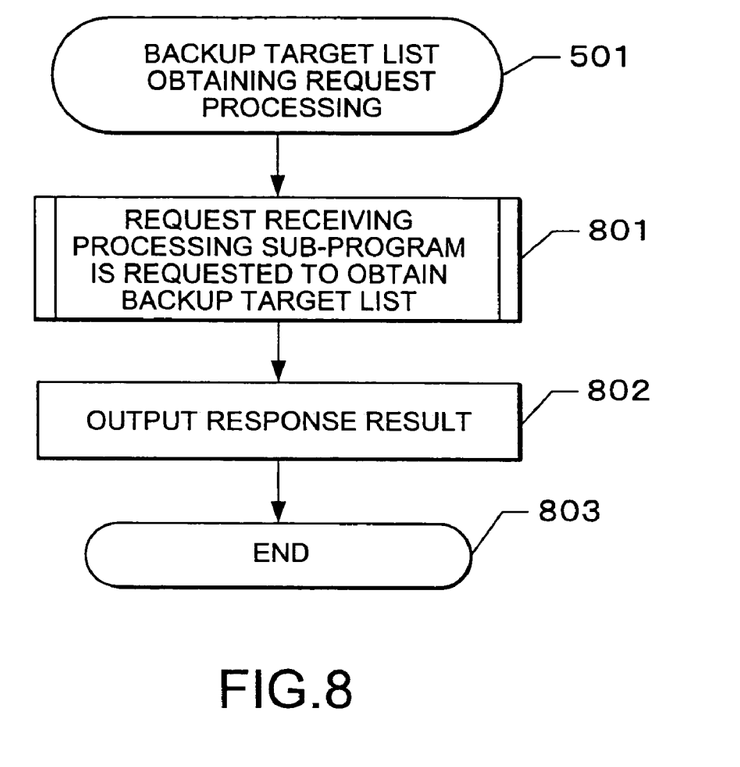
FIG. 8 is a flow chart of a backup target list obtaining request sub-program according to the embodiment of this invention.

FIG. 8 is a flow chart of the backup target list obtaining request sub-program 501 according to the embodiment of this invention.

The backup target list obtaining request sub-program 501 requests the backup program 125 to search a file system that can be backed up (including a snapshot mounted as a file system) from data recorded in the disk drive 115. The management client 132 executes the backup target list obtaining request sub-program 501.

As backup target list obtaining request is started, the request receiving sub-program 401 of the backup program 125 is requested to obtain a list of backup targets (Step S801). Then a response from the request receiving sub-program 401 is outputted (Step S802) to end the processing (Step S803).

The administrator who operates the management client 132 knows which file system among data recorded in the disk drive 115 can be backed up by executing the backup target list obtaining request sub-program 501.

Figure 9:
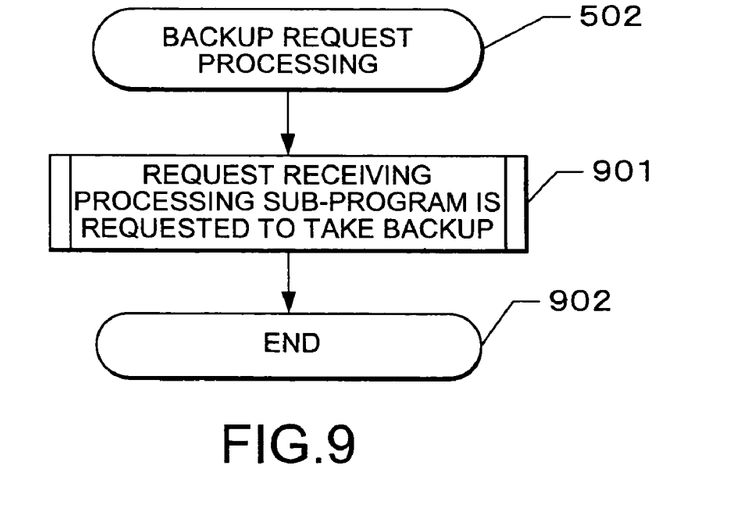
FIG. 9 is a flow chart of a backup request sub-program according to the embodiment of this invention.

FIG. 9 is a flow chart of the backup request sub-program 502 according to the embodiment of this invention.

The backup request sub-program 502 requests the backup program 125 to take a backup of a file system recorded in the disk drive 115, and is executed by the management client 132.

The administrator who operates the management client 132 designates a file system name (snapshot name) that is found to be ready for a backup as a result of executing the backup target list obtaining request sub-program 501, or designates the name of a file system (snapshot name) to which the client is given a right to access by the file server program 121, to execute the backup request sub-program 502. As backup request processing is started, the request receiving sub-program 401 of the backup program 125 is requested to take a backup (Step S901) and then the processing is ended (Step S902).

The administrator who operates the management client 132 can back up a file system recorded in the disk drive 115 to the media server 133 by executing the backup request sub-program 502. Designating a snapshot at this point makes it possible to back up an arbitrary snapshot alone to the media server 133.

Figure 10:
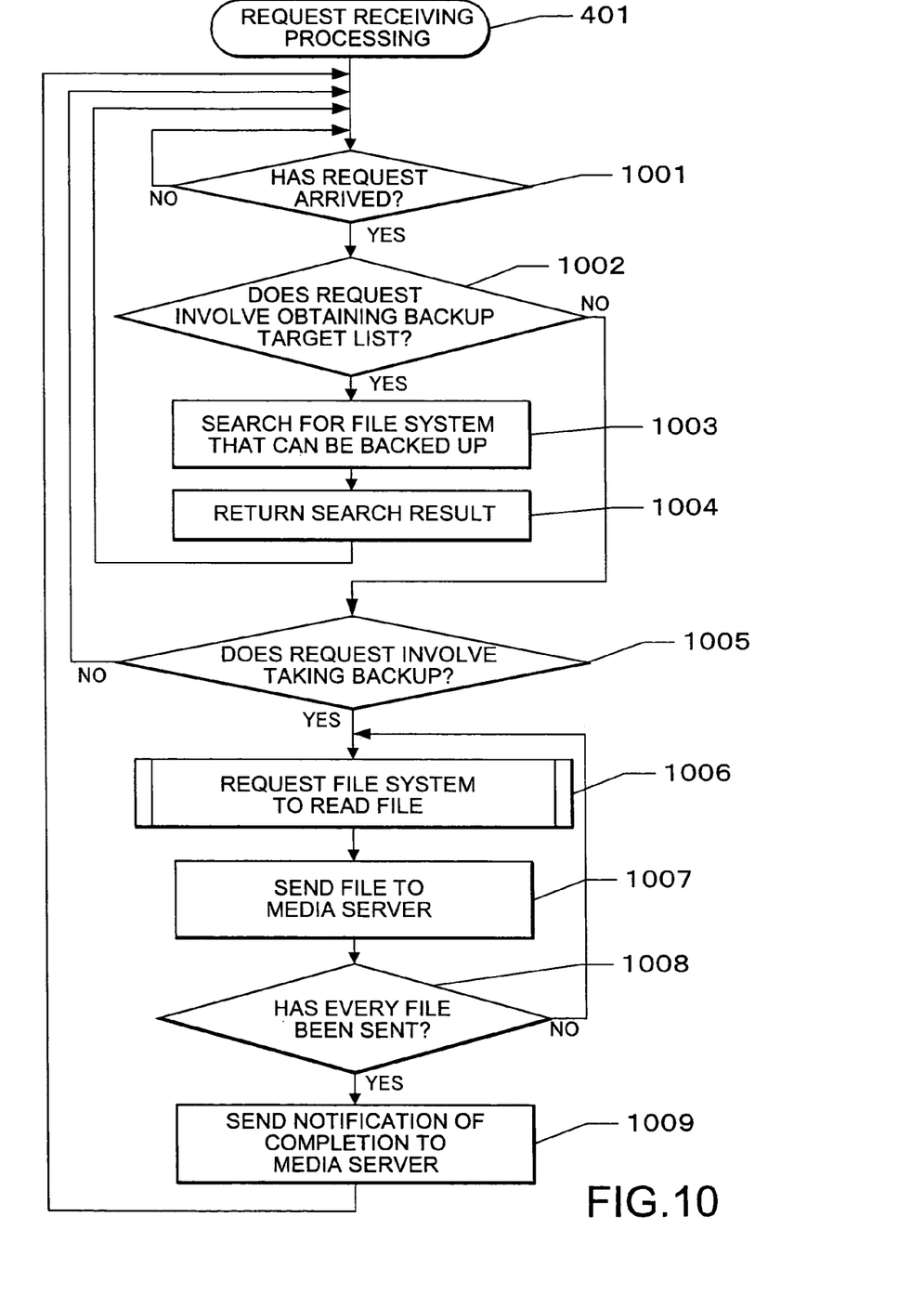
FIG. 10 is a flow chart of a request receiving sub-program according to the embodiment of this invention.

FIG. 10 is a flow chart of the request receiving sub-program 401 according to the embodiment of this invention.

The request receiving sub-program 401 is executed by the CPU 111 and processes a request from the management client 132.

Upon arrival of a request from the management client 132 (Step S1001), the request receiving sub-program 401 judges whether the request is a backup target list obtaining request (Step S1002). When the request is a backup target list obtaining request, the disk drive 115 is searched for a file system that can be backed up (including a snapshot mounted as a file system) (Step S1003). Specifically, to search a snapshot, the mapping table 144 is searched for a stored snapshot name. For example, a search of the mapping table of FIG. 7 yields the snapshot 1 and the snapshot 2 as those that can be backed up.

The file system name (snapshot name) obtained as a result of the search is sent to the management client 132 which has made the request (Step S1004), and the process returns to Step S1001.

On the other hand, when the request is not a backup target list obtaining request, whether the request is a backup request is judged (Step S1005). When the request is a backup request, backup is executed. Executing backup means that the file read request sub-program 201 (FIG. 11) of the file system program 123 is called, a file system designated by the backup request is identified, and data of a file contained in the file system is obtained (Step S1006). The obtained data of the file is sent to the media server 133 (Step S1007).

Then whether every file contained in the file system has been sent is judged (Step S1008). When sending every file is not completed, the process returns to Step S1006 to send remaining files in the file system. On the other hand, when every file contained in the file system has already been sent, a notification of completion is sent to the media server 133 (Step S1009) and the process returns to Step S1001.

Figure 11:
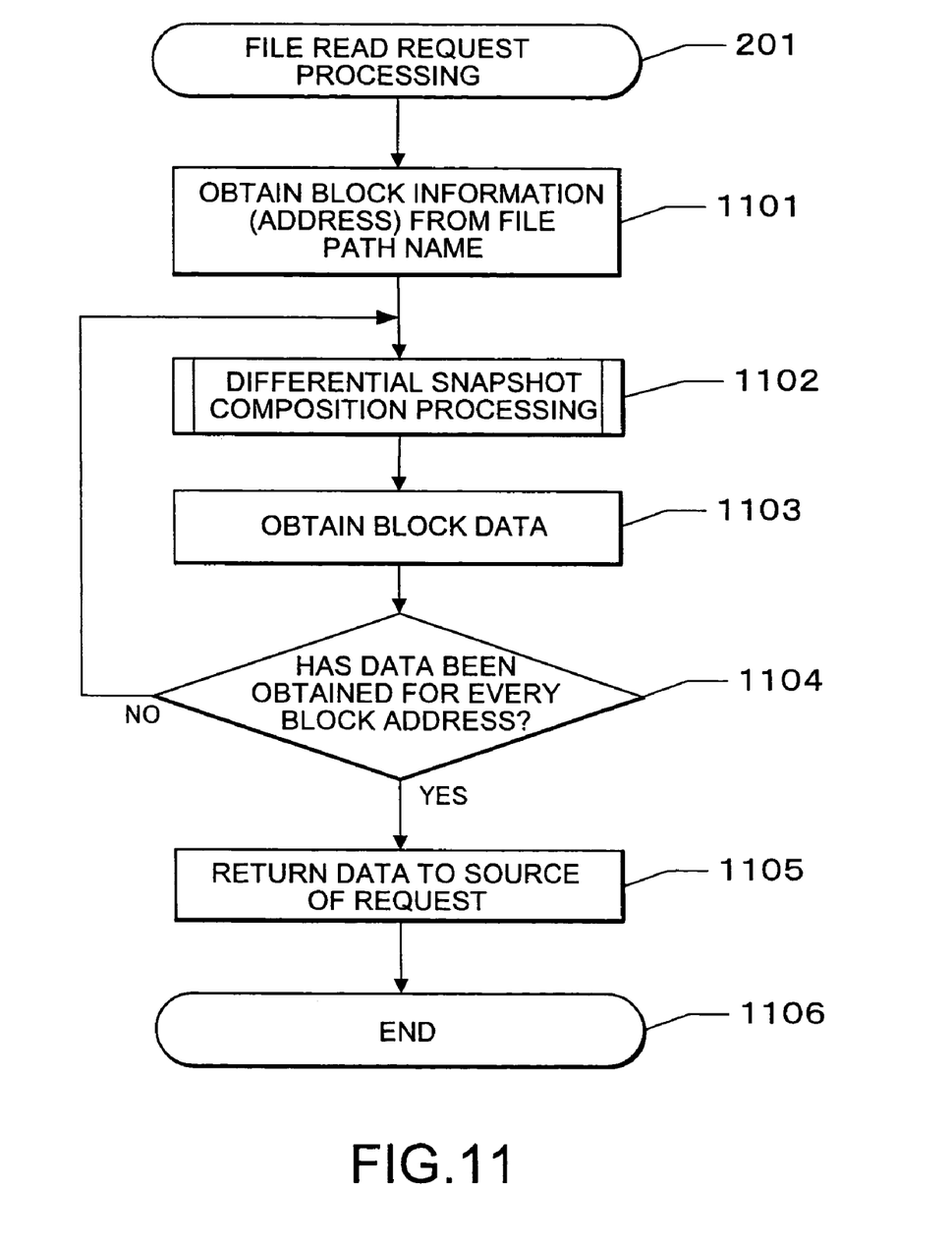
FIG. 11 is a flow chart of a file read request sub-program according to the embodiment of this invention.

FIG. 11 is a flow chart of the file read request sub-program 201 according to the embodiment of this invention.

The file read request sub-program 201 is called up by the request receiving sub-program 401, obtains data of a designated file, and sends the obtained data to the one that has made the request.

The request receiving sub-program 401 calls up the file read request, sub-program 201 while designating a file path name. The file read request sub-program 201 then obtains the address of a block in the primary volume 141 that stores data of a file on which the read request is made (Step S1101). How the block address is obtained will be described later in detail with reference to FIG. 13.

Then the differential snapshot composition sub-program 303 is called to request obtaining of a block address of the virtual volume 143 that corresponds to the obtained block address of the primary volume 141 (Step S1102).

The next step is to read data stored at the obtained block address of the virtual volume 143 (Step S1103).

It is then judged whether data has been obtained for every block address of the requested file (Step S1104). When the obtaining is not complete, the process returns to Step S1102 in order to obtain data for every block address of the requested file.

On the other hand, when data has already been obtained for every block address of the requested file, the obtained data is sent to the one that has called the sub-program (Step S1105) and the processing is ended (Step S1106).

As shown in FIGS. 10 and 11, the backup program 125 obtains and backs up data (block) that constitutes a file for each file in conjunction with the file system program 123 upon receiving a backup request from the management client 132. Therefore, designating a snapshot to be backed up through the management client 132 makes it possible to back up only data (block) of a file that constitutes the virtual volume 143 created for the designated snapshot.

Figure 12:
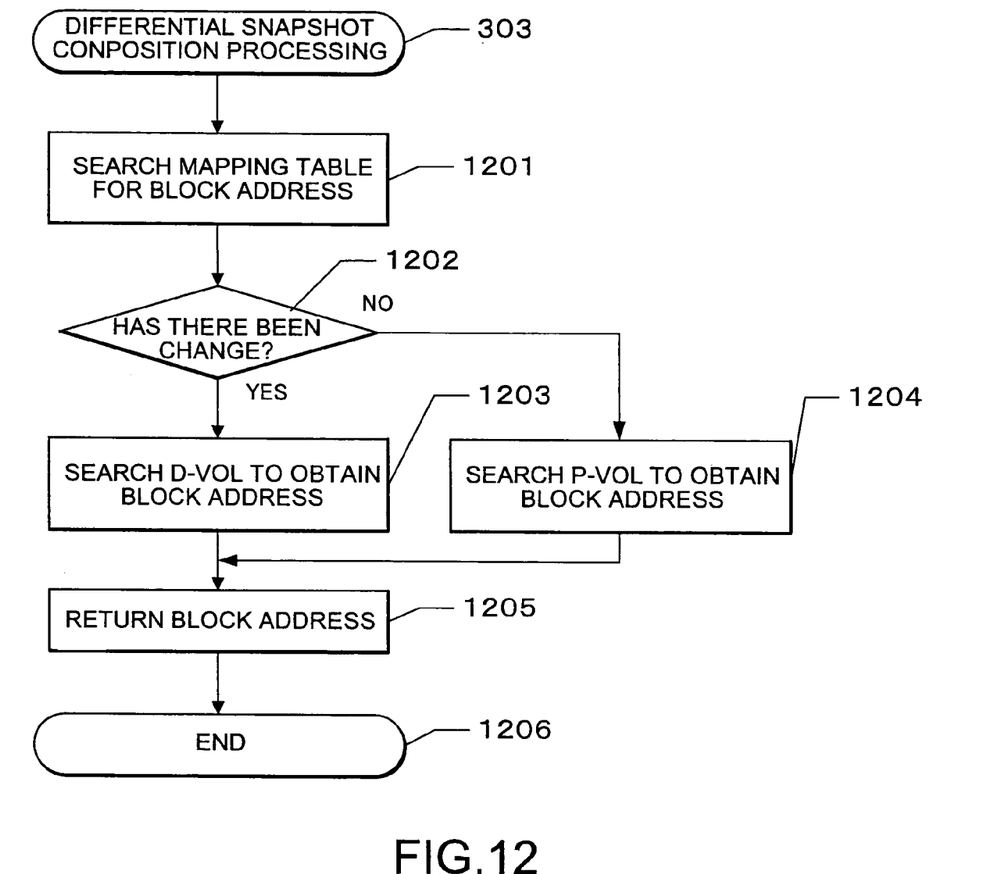
FIG. 12 is a flow chart of a differential snapshot composition sub-program according to the embodiment of this invention.

FIG. 12 is a flow chart of the differential snapshot composition sub-program 303 according to the embodiment of this invention.

The differential snapshot composition sub-program 303 is called up by the file read request sub-program 201, and sends the address of a block that constitutes a designated file system (including a snapshot mounted as a file system) to the one that has made the request. In the case where a snapshot is designated, the differential snapshot composition sub-program 303 sends the address of a block that constitutes the virtual volume of the designated snapshot.

As the file read request sub-program 201 calls up the differential snapshot composition sub-program 303 while designating a block address, the differential snapshot composition sub-program 303 searches the mapping table 144 for the designated block address (Step S1201).

Next, the mapping table 144 is referred and a bit in the changed/unchanged bit map column that corresponds to the designated snapshot is checked in order to judge whether the contents (data) of a block indicated by the block address has been changed (Step S1202). When the corresponding bit is found to be "1" as a result, it is judged that data of the block has been changed and the address shown in the differential volume storage address column of the designated snapshot is obtained (Step S1203).

On the other hand, when the corresponding bit is found to be "0" or when the changed/unchanged bit map column shows unchanged, it is judged that data of the block has not been changed and the designated address is obtained (Step S1204).

The obtained address is sent to the one that has called the sub-program (Step S1205) and then the processing is ended (Step S1206).

Figure 13:
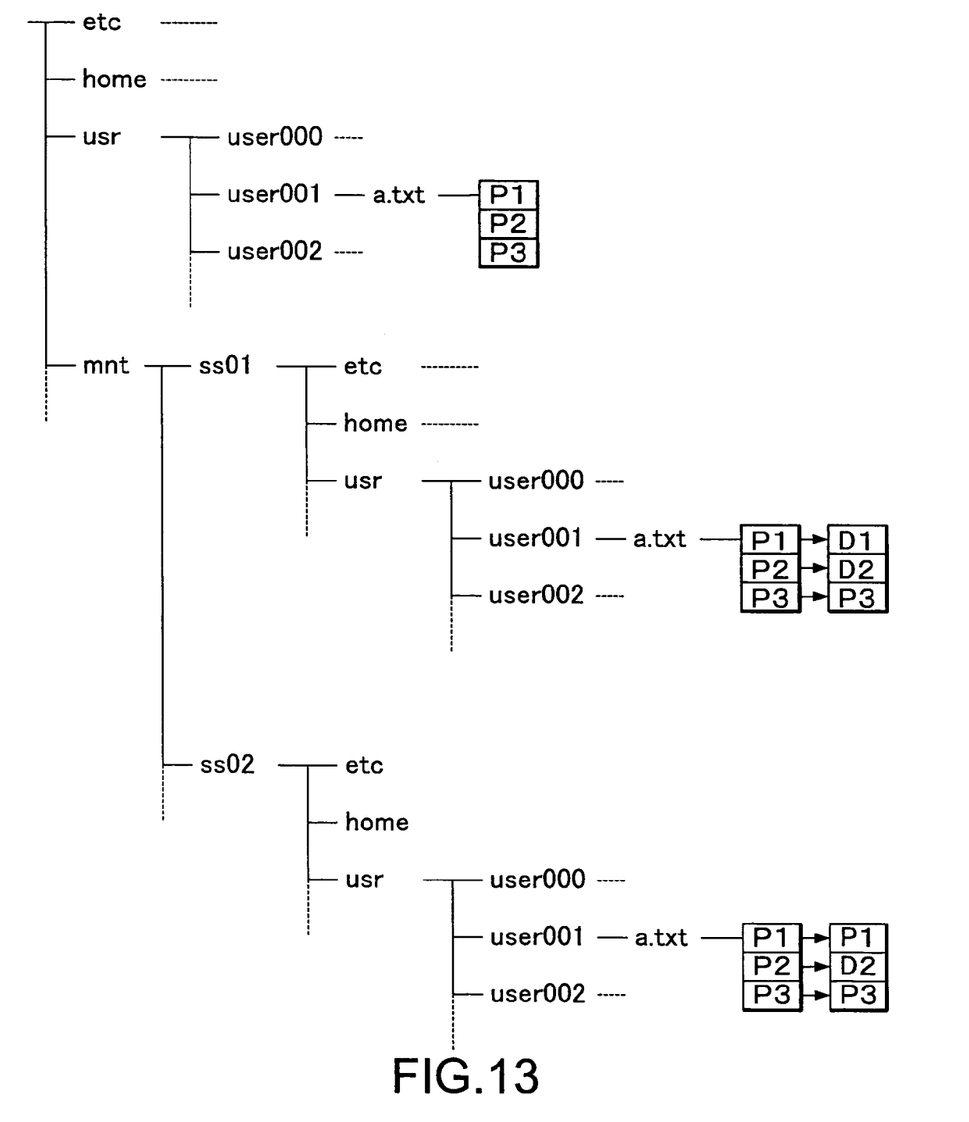
FIG. 13 is an explanatory diagram showing the association between the file path name of a file and a block address of the file in the embodiment of this invention.

FIG. 13 is an explanatory diagram showing the association relation between the path name of a file and a block address of the file according to the embodiment of this invention.

Referring to FIG. 13, a description is given on a procedure of obtaining a block address from a file path name in Step S101 of FIG. 11.

In the example shown in FIG. 13, a file system operated by the file system program 123 has a root directory ("/" in FIG. 13) under which directories "etc", "home", and "usr" are placed. This file system is stored in the primary volume 141 of the disk drive 115. A directory "mnt" and directories under "mnt" do not come to exist until a snapshot is mounted by the file system program 123.

User directories assigned to the respective users that share the NAS 100 are placed under the directory "usr". Of these user directories, a directory "user001" is assigned to a user "001" and a file "a.txt" owned by the user "001" is stored under the directory "user001". The file "a.txt" is associated with the block addresses "P1", "P2", and "P3" of the primary volume 141 by the file system program 123, and data constituting the file "a.txt" is stored in the blocks indicated by the addresses.

In this example, two snapshots are created as in FIG. 7 and data which constitutes the file "a.txt" and which is stored at the block addresses "P1", "P2", and "P3" is updated as shown in the mapping table of FIG. 7.

Prior to obtaining a block address from a file path name in Step S1101 of FIG. 11, the file system program 123 designates a mount point to mount a designated snapshot to a file system. For example, a mount point "/mnt/ss01" is designated as a point to mount the snapshot 1.

Thereafter, when obtaining the block-address of the file "a.txt" of the snapshot 1, for example, the client 131 or the management client 132 designates a file path name "/mnt/ss01/usr/user001/a.txt".

The file system program 123 judges from the fact that the file path name contains "/mnt/ss01" that the client 131 or the management client 132 is attempting to obtain a file of the snapshot 1, and searches the columns "changed/unchanged bit map" and "snapshot 1 differential volume storage address" for "/usr/user001/a.txt". As a result, the directory configuration of the snapshot 1 is virtually reproduced as shown in FIG. 13 under "/mnt/ss01".

The mapping table of FIG. 7 is referred at this point to show that there are differential data for "P1" and "P2" out of blocks that constitute the file "a.txt". Accordingly, "P1" and "P2" are replaced by the blocks "D1" and "D2" of the differential volume 142, respectively. The addresses "D1", "D2", and "P3" of blocks that constitute the file "a.txt" of the snapshot 1 are obtained as a result.

In this way, a group of blocks associated with the snapshot 1 by the mapping table 144 makes the virtual volume 143 of the snapshot 1.

Similarly, when the snapshot 2 is designated to obtain a block address from a file path name, the snapshot 2 is mounted to a mount point "/mnt/ss02".

Thereafter, when obtaining the block address of the file "a.txt" of the snapshot 2, the client 131 or the management client 132 designates a file path name "/mnt/ss01/usr/user001/a.txt".

The file system program 123 judges from the fact that the file path name contains "/mnt/ss02" that the client 131 or the management client 132 is attempting to obtain a file of the snapshot 2, and searches the columns "changed/unchanged bit map" and "snapshot 2 differential volume storage address" for "/usr/user002/a.txt". As a result, the directory configuration of the snapshot 2 is virtually reproduced as shown in FIG. 13 under "/mnt/ss02".

The mapping table of FIG. 7 is referred at this point to show that there is differential data for "P2" out of blocks that constitute the file "a.txt". Accordingly, "P2" is replaced by the block "D2" of the differential volume 142. The addresses "P1", "D2", and "P3" of blocks that constitute the file "a.txt" of the snapshot 2 are obtained as a result.

In this way, a group of blocks associated with the snapshot 2 by the mapping table 144 makes the virtual volume 143 of the snapshot 2.

The above-described embodiment of this invention, in which a generation of snapshot is designated and this snapshot alone is backed up, may be modified such that a backup of generations of data of the same file is taken by designating a file name.

According to the above-described embodiment of this invention, the controller 101 of the NAS 100 causes, upon receiving a backup request from the management client 132 with a snapshot designated, the file system program 123 and the backup program 125 to cooperate with each other, to thereby take a backup of data of the designated snapshot alone. This way backing up unnecessary data is avoided with the result that backup time is shortened and the storage capacity of the backup device can be used efficiently.

While the present invention has been described in detail and pictorially in the accompanying drawings, the present invention is not limited to such detail but covers various obvious modifications and equivalent arrangements, which fall within the purview of the appended claims.

What is claimed is:

1. A backup method for use with a storage system, the storage system comprising:
   a client used by a user;
   a network attached storage device which provides a file sharing service to the client;
   a media server to which data recorded in the network attached storage device is backed up;
   a management client which requests the network attached storage device to carry out the backup; and
   a network which connects the client, the network attached storage device, the media server, and the management client to one another,
   the network attached storage device comprising:
   a network interface connected to the network;
   a memory which stores a control program;
   a disk drive having an primary volume, a differential volume, and a mapping table, the primary volume storing data sent from the client, the differential volume storing differential data of a snapshot of the primary volume, the mapping table managing the relation between data stored in the primary volume and differential data stored in the differential volume, the mapping table including at least one changed/unchanged bit identifying whether differential data corresponding to the snapshot is stored on the differential volume, and also a storage address of the data in the primary volume and a storage address of the differential data of each snapshot, stored in correspondence relationship to one another, a disk interface connected to the disk drive to control data transfer between the client and the disk drive based on a data input/output request from the client; and a control processor which controls read and write of data in the primary volume created from a storage area of the disk drive, which controls to write data stored in the primary volume in the past in the differential volume as differential data for the respective generations, which uses the mapping table to manage, for the respective generations, the address relation between the storage address of the data stored in the primary volume and the storage address of the differential data stored in the differential volume, and which refers to the mapping table to compose the data of the primary volume and the differential data and to create a virtual volume for the respective generations, the backup method comprising the steps of:

controlling the control processor to mount the virtual volume on a mount point in a file system;

controlling the management client to request to the control processor to provide a list of the generations that can be backed up;

causing the control processor to obtain a list of the generations that can be backed up by referring to the mapping table and checking whether the changed/unchanged bit is on or not, and to send the obtained list to the management client;

controlling the management client to request to the control processor to take a backup of a generation selected from the obtained list;

causing the control processor to obtain a path name, including the mount point of the virtual volume, designated with regard to the request to take the backup;

controlling the control processor to determine the designated generation based on the obtained path name;

controlling the control processor to search the mapping table for the designated generation and to obtain the address of data that constitutes the virtual volume;

controlling the control processor to read data stored at the obtained address; and controlling the control processor to send the obtained data of the virtual volume to the media server.

2. A storage system comprising:

a network attached storage device which provides a file sharing service to a client used by a user;

a backup device to which data recorded in the network attached storage device is backed up;

a management client which requests the network attached storage device to take the backup; and a network which connects the client, the network attached storage device, and the backup device to one another, the network attached storage device comprising:

a memory which stores a control program;

a disk drive having an primary volume, a differential volume, and mapping information, the primary volume storing data sent from the client, the differential volume storing differential data of a snapshot of the primary volume, the mapping information managing the relation between data stored in the primary volume and differential data stored in the differential volume, the mapping information including at least one changed/unchanged bit identifying whether differential data corresponding to the snapshot is stored on the differential volume, and also a storage address of the data in the primary volume and a storage address of the differential data of each snapshot, stored in correspondence relationship to one another; and a control processor which controls read and write of data in the disk drive, wherein:

the differential volume stores differential data of a snapshot for the respective generations;

the mapping information manages, for the respective generations, the relation between the storage address of the data stored in the primary volume and the storage address of the differential data, which is associated with the primary volume, stored in the differential volume;

the control processor mounts a virtual volume, constituted by composing the data stored in the primary volume and the differential data stored in the differential volume, on a mount point in a file system;

the management client requests to the control processor to provide information of the generations that can be backed up;

the control processor obtains information of the generations that can be backed up by referring to the mapping information and checking whether the changed/unchanged bit is on or not, and sends the obtained information to the management client;

the management client requests to the control processor to take a backup of data of a snapshot of a generation selected from the obtained information; and the control processor:

obtains a path name, including the mount point of the virtual volume, designated with regard to the request to take the backup;

determines the designated generation based on the obtained path name;

obtains, for the generation designated in the backup request, the storage address of the differential data, which is associated with the storage address of the data stored in the primary volume, stored in the differential volume, by referring to the mapping information;

reads from the differential volume the data stored at the obtained differential volume address;

composes the data stored in the primary volume and the differential data stored in the differential volume to constitute the virtual volume for the respective generations; and sends data of the virtual volume for the respective generations to the backup device.

3. A storage device that is communicably connected via a network to a client used by a user, the storage device comprising:

a memory which stores a control program;

a disk drive having an primary volume, a differential volume, and mapping information, the primary volume storing data sent from the client, the differential volume storing differential data of a snapshot of the primary volume, the mapping information managing the relation between data stored in the primary volume and differential data stored in the differential volume, and a control unit which controls read and write of data in the disk drive, wherein the differential volume stores differential data of the snapshot for respective generations;

wherein the mapping information including at least one changed/unchanged bit identifying whether differential data corresponding to the snapshot is stored on the differential volume, and also a storage address of the data in the primary volume and a storage address of the differential data of each snapshot, where the mapping information manages, for the respective generations, the relation between the storage address of data stored in the primary volume and the storage address of differential data, which is associated with the primary volume, stored in the differential volume, wherein the control unit comprises a differential snapshot management module, a file system processing module and a backup processing module, wherein:

the file system processing module mounts a virtual volume, constituted by composing the data stored in the primary volume and the differential data stored in the differential volume, on a mount point in the file system;

the backup processing module, upon receiving a request from the management client to provide information of generations that can be backed up, obtains information of the generations that can be backed up by referring to the mapping information and checking whether the changed/unchanged bit is on or not, and sends the obtained information to the management client;

the file system processing module obtains a path name, including the mount point of the virtual volume, designated with regard to the request to take the backup;

the file system processing module determines the designated generation based on the obtained path name;

the differential snapshot management module, upon receiving a request from the management client to take a backup of data of a snapshot, obtains, for a generation designated in the backup request, the storage address of the differential data, which is associated with the storage address of the data stored in the primary volume, stored in the differential volume by referring to the mapping information;

the file system processing module reads from the differential volume the data stored at the obtained differential volume address, and composes the data stored in the primary volume and the differential data stored in the differential volume to constitute the virtual volume for the respective generations; and the backup processing module sends data of the virtual volume for the respective generations to the backup device.

4. A computer program product embodied on a tangible storage medium, for use to control a storage device that is communicably connected via a network to a client used by a user, the storage device comprising:

a memory which stores a control program;

a disk drive having an primary volume, a differential volume, and mapping information, the primary volume storing data sent from the client, the differential volume storing differential data of a snapshot of the primary volume, the mapping information managing the relation between data stored in the primary volume and differential data stored in the differential volume, the mapping information including at least one changed/unchanged bit identifying whether differential data corresponding to the snapshot is stored on the differential volume, and also a storage address of the data in the primary volume and a storage address of the differential address of each snapshot, stored in correspondence relationship to one another, and a control processor which controls read and write of data in the disk drive, wherein:

the differential volume stores differential data of a snapshot for the respective generations;

the mapping information manages, for the respective generations, the relation between the storage address of data stored in the primary volume and the storage address of differential data, which is associated with the primary volume, stored in the differential volume;

the program controlling the control processor to execute:

a step of mounting a virtual volume, constituted by composing the data stored in the primary volume and the differential data stored in the differential volume, on a mount point in a file system;

a step of requesting to the control processor to provide information of generations that can be backed up;

a step of controlling the control processor to obtain information of the generations that can be backed up by referring to the mapping information and checking whether the changed/unchanged bit is on or not, and to send the obtained information to the management client; and a step of requesting to the control processor to take a backup of data of a snapshot of a generation selected from the obtained information, a step of obtaining a path name, including the mount point of the virtual volume, designated with regard to the request to take the backup;

a step of determining the designated generation based on the obtained path name;

a step of obtaining, for the generation designated in the backup request, the storage address of the differential data, which is associated with the storage address of the data stored in the primary volume, stored in the differential volume by referring to the mapping information to, a step of reading from the differential volume the differential data stored at the obtained differential volume address, and a step of composing the data stored in the primary volume and the differential data stored in the differential volume to constitute the virtual volume for the respective generations; and a step of sending data of the virtual volume for the respective generations to a backup device.

* * * * *